Dec. 8, 1964     G. MEYER-JAGENBERG     3,160,238
PRESSURE ACTUATED DISK BRAKE
Filed May 6, 1963     2 Sheets-Sheet 2

Dec. 8, 1964    G. MEYER-JAGENBERG    3,160,238
PRESSURE ACTUATED DISK BRAKE
Filed May 6, 1963    2 Sheets-Sheet 2

United States Patent Office 3,160,238
Patented Dec. 8, 1964

3,160,238
PRESSURE ACTUATED DISK BRAKE
Günther Meyer-Jagenberg, Dusseldorf-Grafenberg, Germany, assignor to Jagenberg-Werke A.G., Dusseldorf, Germany
Filed May 6, 1963, Ser. No. 278,100
Claims priority, application Germany, May 12, 1962,
J 21,764
2 Claims. (Cl. 188—152)

The present invention relates broadly to a brake structure and more particularly to a disk brake actuated by fluid pressure.

Still more particularly, the invention relates to an improved pressure disk brake for association with the supply of unwinding rolls in paper processing machinery such as rewind machines, cross-cutting machines or similar machinery in which paper is fed from a supply roll for further processing.

In machinery of this character, it is necessary to provide the braking action for the shaft that carries the unwinding or supply roll of paper. This brake must keep the unwound paper web constantly under tension and for this purpose the axle or shaft for this roll has to be braked. The braking force required is dependent upon the diameter of the unwinding roll or the quality, i.e. the strength factor of the paper and on the width of the paper web. In view of the multiplicity of influencing factors, it is necessary that brakes for the unwinding roll shaft be capable of encompassing a relatively large range of regulation so that any required braking force can be achieved. Commencing with pre-adjusting braking force, the force required to brake the shaft must alter constantly depending upon the decreasing diameter of the supply roll on such shaft. Generally, in a braking mechanism for this purpose, the arrangement is such that the braking force is automatically regulated in a known manner in dependence upon the tension of the web. In arrangements using such automatically operative regulating means, the braking force has previously been produced by means of band-type brakes having rotating and cooled brake drums and which band brakes transmit the braking force to the axle supporting roll. Brakes of this type have a disadvantage in that their manner of construction or mode of operation gives rise to large space requirements, and such brakes further have a tendency to jam or bind so that disorders can occur in the normal course of operation. Another disadvantage exists in the necessity of adapting the rotary brake drum to serve as a cooling chamber. This last-mentioned factor creates difficulties in that the proper circulation of coolant is disturbed by the centrifugal forces developed during operation.

For the above-noted reasons, band brakes are being replaced by disk-type brakes which are generally distinguished by requiring a smaller structure. Usually, such disk brakes consist of one or more rotary braking disks and the lateral parts for clamping these disks. In these lateral parts are mounted pistons which are actuated by fluid pressure for applying the actuating movement to the braking disks located intermediate the lateral parts. Further, the lateral parts accommodate cooling chambers. Arranging cooling chambers in such parts is a disadvantage insofar as such chambers must be mounted to shift axially with the piston. Furthermore, in the known embodiment of disk brakes, difficulties arise when large ranges of braking forces become necessary. Consequently, in order to provide adequate braking forces it is necessary to provide relatively large piston and cylinder diameters, thus resulting in structure encompossing a large space.

It is, therefore, a primary object of the present invention to provide a disk brake structure capable of applying a wide range of braking forces but constructed and arranged to occupy a relatively small space and thus, the fluid pressure-actuated disk brake of the invention is extremely compact yet capable of a wide range of regulatory action.

Therefore, for solving the problem outlined above, the present invention has for a further object to provide a disk brake structure incorporating two or more pressure systems that are independent of one another and which operate to generate the required braking forces. Further, the invention provides an arrangement in which the braking forces developed by the separate pressure systems can vary in magnitude.

It is, therefore, a further object of the invention to provide an arrangement in which the two independent pressure systems are constructed in annular form and surround the axis of the disk brake. In this regard, the effective pressure surfaces of the two annular pressure chambers or systems vary in size so that braking forces of varying magnitudes can be developed. It is a further feature of the invention that the braking forces generated in the separate pressure chambers can be applied selectively, individually, or simultaneously.

It is, therefore, a specific object of this invention to provide a disk brake arrangement which includes rotary braking disks mounted for movement towards stationary counter disks, the counter disks being carried by a stationary support disposed between the rotary disks, said stationary support including a hollow annular chamber carrying coolant and likewise, including bearing means for supporting the shaft or axle for the rotary brake disks.

Additionally, the present invention has as an object to provide a fluid pressure actuated disk brake arrangement including a braking member and a member to be braked, means mounting said members for relative axial movement into brake engagement relation, means mounting one of said members for rotation relative to the other, said one member having at least two annular variable-volume, pressure-receiving chambers associated therewith, a complementary reaction member for said chambers and means for independently supplying said chambers with fluid under pressure to effect brake engaging movement between the members.

Further and more specific objects will be apparent from the following description taken in connection with the accompanying drawing illustrating a preferred embodiment.

FIG. 1 shows a cross section of the disk brake,

Figure 2:
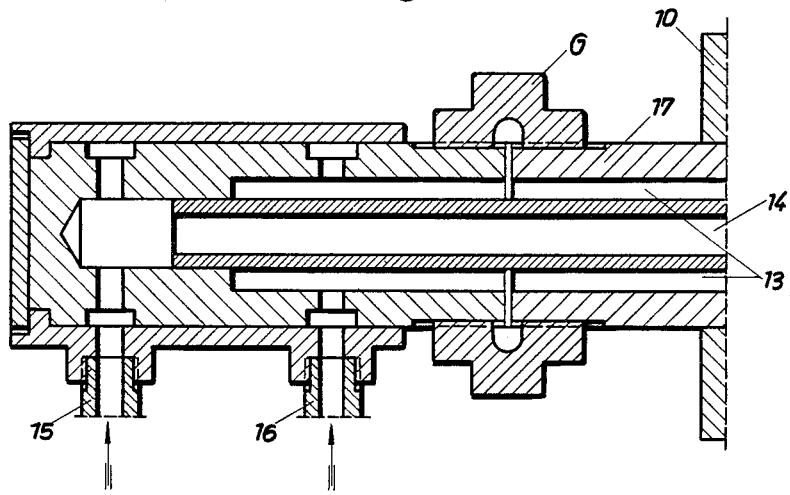
FIG. 2 illustrates in enlarged scale the air lead to the two chambers.

In the arrangement illustrated, the braking arrangement for the unwinding roll includes a stationary housing or support 1 provided with a central aperture receiving a suitable bearing such as sleeve bearing 1' that rotatably journals axle or shaft 2. The housing 1 includes an annular hollow chamber within which is contained a coolant medium denoted at 3. The top of the housing is provided with an opening 110 with which is associated a fitting 111 through which the coolant can be introduced. This fitting can be closed by suitable cap means not shown.

Opposed brake disks 4 and 5 are mounted on shaft 2 for axial movement therealong so that they can move into braking engagement. The disk 5 has connected therewith a socket member 51 within which fits a head RH on the end of shaft RS that serves as an axle for the roll R. The socket member 51 has a plurality of arms 52 projecting therefrom, each of which can be V-shaped in cross-section so as to securely grip the head RH assuming the latter to be square. Further, the head and arms are coupled so that relative axial movement is permitted.

The face of the brake disk 4 is provided with two concentric annular grooves that define annular pressure chambers 6 and 7. These respective pressure chambers are sealed by annular rims or projections 8 and 9 formed on a rotary disk 10. The disk 10 is fixedly connected with the extension or projection 17 of the shaft 2. Bores 11 and 12 are provided in the disk 10 for conducting pressure fluid into the chambers 7 and 6, respectively. These bores are connected with channels 13 and 14 in the extension 17 of shaft 2. These channels are fed with compressed air via conduits 15 and 16 and a source of compressed air not shown.

The surfaces of the disks 4 and 5 directed toward the stationary support or housing 1 are provided with brake linings 18 and 19 that cooperate during the braking action with brake linings 20 and 21 on the opposite faces of the housing or support 1. The inner end of the shaft 2 is provided with a head 22 adapted to abut against a portion of the disk 5 so that when the head 2 shifts to the left, the disk 5 is moved toward the housing 1.

The manner of operation of the disk brake of the invention is believed apparent from the foregoing. Thus, when compressed air is admitted via conduits 15 and/or 16 and flows into one or both of the pressure chambers 6 and 7, disk 4 is moved toward the housing 1 to apply brake linings 18 against lining 20. Simultaneously, disk 10 is moved away from the housing drawing with it shaft 2 so that the head 22 moves disk 5 toward the housing to apply brake lining 19 against the lining 21 on the other face of the housing.

In order to provide for variable braking forces, the structure is such that the pressure fluid can flow selectively into either chambers 6 and 7 or simultaneously into both. By this means, a relatively wide range of brake regulation corresponding to the effective pressure surfaces involved is obtained. Thus, small brake pressure can be applied via only chamber 7, medium pressure will be applied using only pressure chamber 6 and a relatively great braking pressure can be applied utilizing both pressure chambers simultaneously. This relationship permits far-reaching adaptation of the braking forces to the quality of the paper, the width of whatever paper is used and the diameter of the roll.

By suitable means the construction above-described renders it possible to provide automatic stepless transition from one pressure chamber to another. For example, at the commencement of operation with the roll of paper at its greatest diameter, the braking force is applied simultaneously to both pressure chambers 6 and 7 so that maximum brake force is applied. As the paper is fed off the roll, the diameter decreases and the brake force must likewise decrease. A stepless decrease of braking force is achieved by utilizing a pressure-regulating valve which receives a control impulse from an impulse roller influenced by the paper web. Therefore, after certain unwinding and resultant diminishing of pressure supply to both chambers 6 and 7 to the point where the smallest braking force obtainable utilizing both chambers has been reached, the flow into pressure 7 is cut off and the flow into chamber 6 is increased, that is, the pressure supplied to these respective chambers is stopped and increased so that pressure 6 is brought up to maximum pressure so that the braking force applied by this single chamber corresponds to the lowest braking force that can be obtained from utilizing chambers 6 and 7 simultaneously with minimum pressure input. After diminishing the force applied by chamber 6 to the point where the smallest possible braking force using this single chamber is reached, flow is stopped to this chamber and flow under maximum pressure is commenced in chamber 7. Again, the maximum braking force that can be applied via chamber 7 is regulated to correspond to the lowest braking force that can be applied by chamber 6. In this manner, one can obtain a stepless transition from the highest to the lowest possible braking force so as to obtain a range of regulation of all required braking forces.

Obviously, a rotary gland or stuffing box G has to be provided between the extension 17 of shaft 2 and the fitting into which pipes 15 and 16 communicate.

Figure 3:
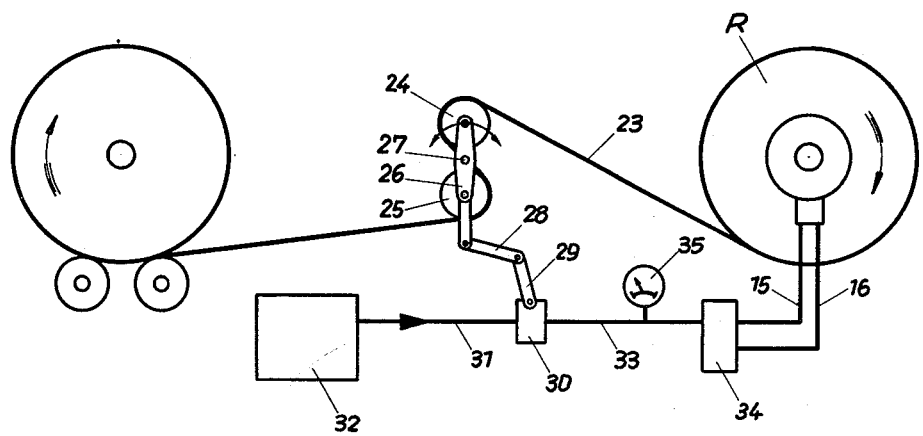
FIG. 3 is a diagrammatic view of the control system for the disk brake.
Figure 2:
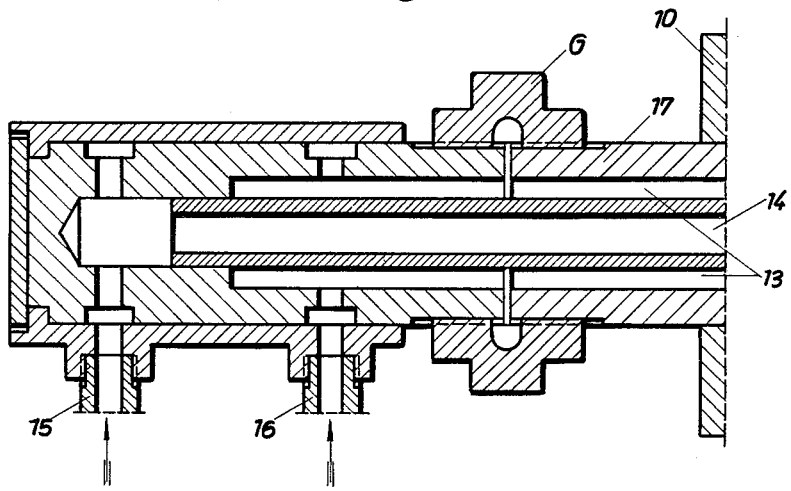
Figure 3:
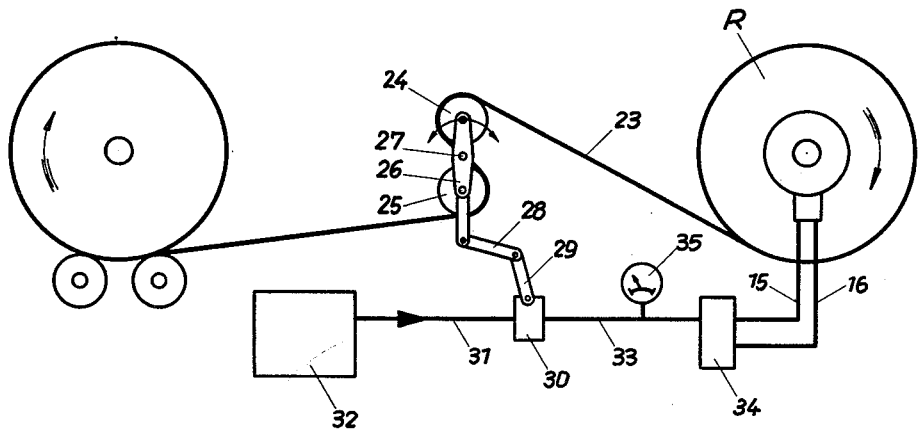

As indicated in FIG. 3 the compressed air is adjusted in dependence upon the web tension which, due to the decreasing roll diameter, continuously varies. The paper web 23 embraces the rolls 24 and 25 which are freely revolving on lever 26. This lever 26 is pivotable round a center 27. With increasing web tension, the lever is turned clockwise and thereby operates via levers 28 and 29 a pressure reduction valve 30. Through pipe 31 connected to a compressor 32 air is supplied under constant pressure to the pressure reduction valve 30 and from such valve with reduced pressure through pipe 33 to an electro-magnetic valve 34 which distributes the compressed air to conduits 15 and 16. Distribution of the air is made in dependence upon pressure gauge 35 being connected to pipe 33. Depending on the pressure in pipe 33 the pressure gauge 35 adjusts the magnetic valve 34 in such a way that either both conduits 15 and 16 together or only one of such conduits are fed with compressed air.

What is claimed is:

1. A fluid pressure operated brake structure for braking a rotary member comprising a stationary housing having opposite faces, brake lining on said faces, said housing having a central aperture therethrough, shaft means journalled in said aperture, said shaft means projecting beyond both sides of said housing, a first disk member mounted on said shaft means on one side of said housing for axial movement along said shaft means, a second disk member mounted on said shaft means at the other side of said housing for axial movement relative to said shaft means and said housing, a third disk member coupled to said shaft means and mounted thereon adjacent one of said first two mentioned disk members, said first-mentioned disk member carrying a coupling member adapted for engagement with a rotary shaft to be braked, the other of said first-mentioned disk members having two independent annular grooves of different sizes concentrically arranged and surrounding the axis of rotation of such disk, said third-mentioned disk member having two annular ribs complementary to and disposed within the respective grooves whereby said ribs and grooves cooperate to define two independent pressure chambers thereby resulting in the generation of braking forces of varied magnitude, and means for supplying pressure fluid selectively to either pressure chamber singly or to both chambers.

2. A fluid pressure operated brake structure for braking a rotary member comprising a stationary housing having opposite faces, a brake lining on each face, said housing having a central aperture therethrough, a sleeve bearing positioned in said aperture, shaft means journalled in said sleeve bearing, said shaft means projecting beyond both sides of said housing, said housing being provided with an annular chamber containing a coolant medium, a first disk member mounted on said shaft means on one side of said housing for axial movement along said shaft means, a second disk member mounted on said shaft means at the other side of said housing for axial movement relative to said shaft means and said housing, a third disk member coupled to said shaft means and mounted thereon adjacent said second disk member, said first disk member carrying a coupling means adapted for engagement with a rotary shaft to be braked, said second disk member having two independent annular grooves of different sizes concentrically arranged and surrounding the axis of rotation of said disk, said third disk member having two annular ribs complementary to and disposed within the respective grooves whereby said ribs and grooves cooperate to define two independent pressure chambers thereby resulting in the generation of braking forces of varied magnitude, means for supplying pressure fluid selectively to either pressure chamber singly or to both chambers, and a brake lining on said first and second disk members for coaction with the brake linings on the housing.

References Cited by the Examiner
UNITED STATES PATENTS

| | | | |
|---|---|---|---|
| 1,968,130 | 7/34 | Criley | 188—152 |
| 2,082,277 | 6/37 | Dierfeld | 188—152 |
| 2,472,548 | 6/49 | Schnell | 242—75.43 |
| 2,487,117 | 11/49 | Eaton | 188—152 |
| 2,616,262 | 11/52 | Driscoll | 188—152 |
| 2,719,621 | 10/55 | Clough | 192—87 |
| 2,826,277 | 3/58 | Hawley | 188—152 |
| 2,916,122 | 12/59 | Hindmarch | 192—85 |
| 2,961,183 | 11/60 | Herr | 188—152 |
| 2,971,612 | 2/61 | Graber | 188—152 |

ARTHUR L. LA POINT, *Primary Examiner.*
EUGENE G. BOTZ, *Examiner.*